(12) United States Patent
Guo et al.

(10) Patent No.: US 10,588,118 B2
(45) Date of Patent: Mar. 10, 2020

(54) SEMI-ORTHOGONAL TRANSMISSION-BASED COMMUNICATION METHOD AND DEVICE

(71) Applicant: Huawei Technologies Co., Ltd., Shenzhen (CN)

(72) Inventors: Zhiheng Guo, Beijing (CN); Hai Wu, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 15/805,386

(22) Filed: Nov. 7, 2017

(65) Prior Publication Data

US 2018/0063822 A1   Mar. 1, 2018

Related U.S. Application Data

(63) Continuation of application No. PCT/CN2015/078672, filed on May 11, 2015.

(51) Int. Cl.
*H04W 72/04* (2009.01)
*H04B 7/0452* (2017.01)

(52) U.S. Cl.
CPC ........ *H04W 72/042* (2013.01); *H04B 7/0452* (2013.01); *H04W 72/04* (2013.01); *H04W 72/0473* (2013.01)

(58) Field of Classification Search
CPC .......................... H04W 7/0452; H04W 72/042
See application file for complete search history.

(56) References Cited

U.S. PATENT DOCUMENTS

2007/0066229 A1   3/2007   Zhang et al.
2010/0041406 A1   2/2010   Kim et al.
(Continued)

FOREIGN PATENT DOCUMENTS

CN   101557611 A   10/2009
CN   101997653 A   3/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V12.5.0, Mar. 2015, 136 pages.
(Continued)

*Primary Examiner* — Zhensheng Zhang
(74) *Attorney, Agent, or Firm* — Slater Matsil, LLP

(57) ABSTRACT

A semi-orthogonal transmission-based communication method and a device, with the method including receiving, by first user equipment, downlink control information sent by a base station, where the downlink control information includes at least one of downlink control parameter of the first user equipment, pairing layer information of the first user equipment, modulation scheme information of second user equipment, power allocation information, an identifier of the first user equipment, or pairing information, and receiving, by the first user equipment, a data signal of an associated user equipment group that is sent by the base station, by the first user equipment, the data signal of the first user equipment according to the downlink control information and the data signal of the associated user equipment group.

11 Claims, 3 Drawing Sheets

(56) References Cited

U.S. PATENT DOCUMENTS

| | | | |
|---|---|---|---|
| 2013/0130707 A1 | 5/2013 | Tarokh et al. | |
| 2013/0265951 A1 | 10/2013 | Ng et al. | |
| 2015/0312074 A1* | 10/2015 | Zhu | H04L 27/2627 370/329 |
| 2016/0029350 A1 | 1/2016 | Kishiyama et al. | |
| 2016/0037460 A1 | 2/2016 | Benjebbour et al. | |
| 2016/0066345 A1* | 3/2016 | Sun | H04W 74/006 370/329 |
| 2016/0204969 A1 | 7/2016 | Zhu et al. | |
| 2018/0069651 A1 | 3/2018 | Davydov et al. | |

FOREIGN PATENT DOCUMENTS

| | | |
|---|---|---|
| CN | 102187596 A | 9/2011 |
| CN | 102378343 A | 3/2012 |
| CN | 103229580 A | 7/2013 |
| CN | 103338455 A | 10/2013 |
| CN | 103491621 A | 1/2014 |
| CN | 103959880 A | 7/2014 |
| CN | 104247359 A | 12/2014 |
| EP | 2648448 A1 | 10/2013 |
| JP | 2014154962 A | 8/2014 |
| JP | 2014204277 A | 10/2014 |
| JP | 2018506898 A | 3/2018 |
| JP | 2018515950 A | 6/2018 |
| WO | 2012015920 A2 | 2/2012 |
| WO | 2016164069 A1 | 10/2016 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 12)," 3GPP TS 36.212 V12.4.0, Mar. 2015, 94 pages.

"Candidate Schemes for Superposition Transmission," Agenda Item: 7.2.7.3, Source: Huawei, HiSilicon, Document for: Discussion, 3GPP TSG RAN WG1#80b, R1-151848, Belgrade, Serbia, Apr. 20-24, 2015, 11 pages.

* cited by examiner

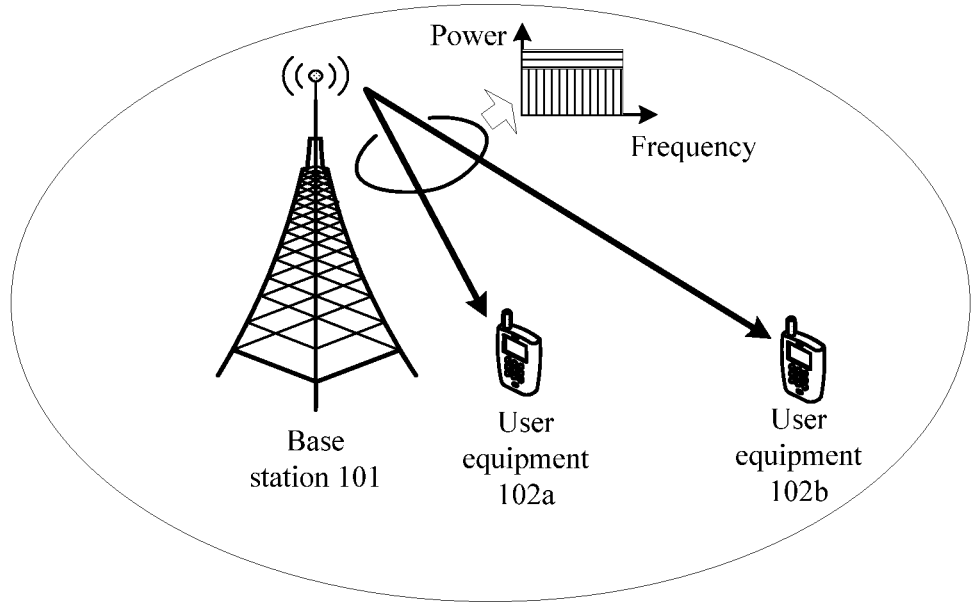

FIG. 1

```
┌─────────────────────────────────────────────────────────────┐
│ First user equipment receives downlink control information  │
│ sent by a base station, where the downlink control          │
│ information includes at least one of a downlink control     │ 201
│ parameter of the first user equipment, pairing layer        │
│ information of the first user equipment, modulation scheme  │
│ information of second user equipment, power allocation      │
│ information, an identifier of the first user equipment, or  │
│ pairing information                                         │
└─────────────────────────────────────────────────────────────┘
                              │
                              ▼
┌─────────────────────────────────────────────────────────────┐
│ The first user equipment receives a data signal of an       │
│ associated user equipment group that is sent by the base    │ 202
│ station, where the data signal of the associated user       │
│ equipment group includes a data signal of the first user    │
│ equipment and a data signal of the second user equipment    │
└─────────────────────────────────────────────────────────────┘
                              │
                              ▼
┌─────────────────────────────────────────────────────────────┐
│ The first user equipment determines the data signal of the  │
│ first user equipment according to the downlink control      │ 203
│ information and the data signal of the associated user      │
│ equipment group                                             │
└─────────────────────────────────────────────────────────────┘
```

FIG. 2

SEMI-ORTHOGONAL TRANSMISSION-BASED COMMUNICATION METHOD AND DEVICE

CROSS-REFERENCE TO RELATED APPLICATIONS

This application is a continuation of International Application No. PCT/CN 2015/078672, filed on May 11, 2015, the disclosure of which is hereby incorporated by reference in its entirety.

TECHNICAL FIELD

Embodiments of the present invention relate to the communications field, and more specifically, to a semi-orthogonal transmission-based communication method and a device.

BACKGROUND

In a Long Term Evolution (LTE)/Long Term Evolution Advanced (LTE-A) communications system, a downlink multiple access mode is usually an orthogonal frequency division multiple access (OFDMA) mode. A main feature of the orthogonal frequency division multiple access mode is that different user equipments (UEs) use different time-frequency resources to ensure no interference to received signals of the different UEs, and implement simple reception on a UE side. However, when communication is performed in the orthogonal frequency division multiple access mode, utilization of time-frequency resources is relatively low, resulting in limitation on an overall transmission rate of a communications system.

In a non-orthogonal multiple access (NOMA) transmission mode, information of multiple UEs can be transmitted on a single resource element (RE). Compared with OFDMA, NOMA improves an overall transmission rate of a system. Further, in a semi-orthogonal multiple access (SOMA) transmission mode, a property of Gray code in an existing modulation scheme (or constellation diagram) is used, so that a receiver of UE may use a simple receive algorithm, to further improve system performance.

However, in an SOMA communication process of an LTE system, a downlink control parameter transmission method adapted to SOMA communication is required.

SUMMARY

Embodiments of the present invention provide a semi-orthogonal transmission-based communication method and a device, so as to provide a solution of transmitting a downlink control parameter in an SOMA communication process.

According to a first aspect, an embodiment of the present invention provides a semi-orthogonal transmission-based communication method, including receiving, by first user equipment, downlink control information sent by a base station, where the downlink control information includes at least one of a downlink control parameter of the first user equipment, pairing layer information of the first user equipment, modulation scheme information of second user equipment, power allocation information, an identifier of the first user equipment, or pairing information, where the pairing layer information of the first user equipment includes a pairing relationship between a spatial layer of the first user equipment and a spatial layer of the second user equipment, the first user equipment and the second user equipment are in an associated user equipment group, the identifier is used to represent that the first user equipment is cell-center user equipment, and the pairing information is used to indicate whether the first user equipment is paired user equipment. The method further includes receiving, by the first user equipment, a data signal of the associated user equipment group that is sent by the base station, where the data signal of the associated user equipment group includes a data signal of the first user equipment and a data signal of the second user equipment, and determining, by the first user equipment, the data signal of the first user equipment according to the downlink control information and the data signal of the associated user equipment group.

With reference to the first aspect, in a first implementation of the first aspect, the downlink control parameter of the first user equipment includes a modulation scheme of the first user equipment, and the determining, by the first user equipment, the data signal of the first user equipment according to the downlink control information and the data signal of the associated user equipment group includes determining, by the first user equipment, power allocation ratios of the first user equipment and the second user equipment according to the modulation scheme information of the second user equipment in the downlink control information, the power allocation information in the downlink control information, and a preconfigured power allocation comparison table, where the preconfigured power allocation comparison table includes a correspondence between a power allocation ratio and a modulation scheme combination, each modulation scheme combination is corresponding to multiple power allocation ratios, the power allocation information is used to indicate a currently used power allocation ratio, and the modulation scheme combination includes a combination relationship between a modulation scheme of the first user equipment and a modulation scheme of the second user equipment, and determining, by the first user equipment, the data signal of the first user equipment according to the downlink control information, the power allocation ratios, and the data signal of the associated user equipment group.

With reference to the first aspect and the foregoing implementation of the first aspect, in a second implementation of the first aspect, the downlink control parameter of the first user equipment includes a modulation scheme of the first user equipment, and the determining, by the first user equipment, the data signal of the first user equipment according to the downlink control information and the data signal of the associated user equipment group includes determining, by the first user equipment, power allocation ratios of the first user equipment and the second user equipment according to the modulation scheme information of the second user equipment in the downlink control information and a preconfigured power allocation comparison table, where the preconfigured power allocation comparison table includes a correspondence between a power allocation ratio and a modulation scheme combination, each modulation scheme combination is corresponding to one power allocation ratio, and the modulation scheme combination includes a combination relationship between a modulation scheme of the first user equipment and a modulation scheme of the second user equipment, and determining, by the first user equipment, the data signal of the first user equipment according to the downlink control information, the power allocation ratios, and the data signal of the associated user equipment group.

With reference to the first aspect and the foregoing implementations of the first aspect, in a third implementation of the first aspect, the determining, by the first user equipment, the data signal of the first user equipment according to the downlink control information, the power allocation ratios, and the data signal of the associated user equipment group includes determining, by the first user equipment according to the downlink control information, the power allocation ratios, and the data signal of the associated user equipment group, a data signal corresponding to the spatial layer of the first user equipment indicated by the pairing layer information.

With reference to the first aspect and the foregoing implementations of the first aspect, in a fourth implementation of the first aspect, the downlink control information further includes a transmission mode indication, and a transmission mode includes closed-loop spatial multiplexing CLSM, open-loop spatial multiplexing OLSM, or transmit diversity TXD.

With reference to the first aspect and the foregoing implementations of the first aspect, in a fifth implementation of the first aspect, precoding information in the downlink control parameter includes the transmission mode indication, and the transmission mode includes CLSM, OLSM, or TXD.

With reference to the first aspect and the foregoing implementations of the first aspect, in a sixth implementation of the first aspect, information included in the downlink control information is coded by using a joint coding mode.

According to a second aspect, an embodiment of the present invention provides a semi-orthogonal transmission-based communication method, including sending, by a base station, downlink control information to first user equipment, where the downlink control information includes at least one of a downlink control parameter of the first user equipment, pairing layer information of the first user equipment, modulation scheme information of second user equipment, power allocation information, an identifier of the first user equipment, or pairing information, where the pairing layer information of the first user equipment includes a pairing relationship between a spatial layer of the first user equipment and a spatial layer of the second user equipment, the first user equipment and the second user equipment are in an associated user equipment group, the identifier is used to represent that the first user equipment is cell-center user equipment, and the pairing information is used to indicate whether the first user equipment is paired user equipment, and sending, by the base station, a data signal of the associated user equipment group to the first user equipment, where the data signal of the associated user equipment group includes a data signal of the first user equipment and a data signal of the second user equipment.

With reference to the second aspect, in a first implementation of the second aspect, the base station sends the data signal of the associated user equipment group to the second user equipment.

With reference to the second aspect and the foregoing implementation of the second aspect, in a second implementation of the second aspect, the downlink control information further includes a transmission mode indication, and before the sending, by a base station, downlink control information to first user equipment, the method further includes, determining, by the base station, the transmission mode indication of the first user equipment according to a transmission mode of the second user equipment, where the transmission mode includes closed-loop spatial multiplexing CLSM, open-loop spatial multiplexing OLSM, or transmit diversity TXD.

With reference to the second aspect and the foregoing implementations of the second aspect, in a third implementation of the second aspect, information included in the downlink control information is coded by using a joint coding mode.

According to a third aspect, an embodiment of the present invention provides user equipment, including a receiving unit, configured to receive downlink control information sent by a base station, where the downlink control information includes at least one of a downlink control parameter of the user equipment, pairing layer information of the user equipment, modulation scheme information of second user equipment, power allocation information, an identifier of the user equipment, or pairing information, where the pairing layer information of the user equipment includes a pairing relationship between a spatial layer of the user equipment and the second user equipment, the user equipment and the second user equipment are in an associated user equipment group, the identifier is used to represent that the user equipment is cell-center user equipment, and the pairing information is used to indicate whether the user equipment is paired user equipment, where the receiving unit is further configured to receive a data signal of the associated user equipment group that is sent by the base station, where the data signal of the associated user equipment group includes a data signal of the user equipment and a data signal of the second user equipment, and a processing unit, configured to determine the data signal of the user equipment according to the downlink control information and the data signal of the associated user equipment group.

With reference to the third aspect, in a first implementation of the third aspect, the downlink control parameter of the user equipment includes a modulation scheme of the user equipment, and the processing unit is specifically configured to determine power allocation ratios of the user equipment and the second user equipment according to the modulation scheme information of the second user equipment in the downlink control information, and the power allocation information in the downlink control information, and a preconfigured power allocation comparison table, where the preconfigured power allocation comparison table includes a correspondence between a power allocation ratio and a modulation scheme combination, each modulation scheme combination is corresponding to multiple power allocation ratios, the power allocation information is used to indicate a currently used power allocation ratio, and the modulation scheme combination includes a combination relationship between a modulation scheme of the user equipment and a modulation scheme of the second user equipment, and determine the data signal of the user equipment according to the downlink control information, the power allocation ratios, and the data signal of the associated user equipment group.

With reference to the third aspect and the foregoing implementation of the third aspect, in a second implementation of the third aspect, the downlink control parameter of the user equipment includes a modulation scheme of the user equipment, and the processing unit is specifically configured to determine power allocation ratios of the user equipment and the second user equipment according to the modulation scheme information of the second user equipment in the downlink control information and a preconfigured power allocation comparison table, where the preconfigured power allocation comparison table includes a correspondence between a power allocation ratio and a modulation scheme combination, each modulation scheme combination is corresponding to one power allocation ratio, and the modulation scheme combination includes a combination relationship between a modulation scheme of the user equipment and a modulation scheme of the second user equipment, and determine the data signal of the user equipment according to the downlink control information, the power allocation ratios, and the data signal of the associated user equipment group.

With reference to the third aspect and the foregoing implementations of the third aspect, in a third implementation of the third aspect, the processing unit is specifically configured to determine, according to the downlink control information, the power allocation ratios, and the data signal of the associated user equipment group, a data signal corresponding to the spatial layer of the user equipment indicated by the pairing layer information.

With reference to the third aspect and the foregoing implementations of the third aspect, in a fourth implementation of the third aspect, the downlink control information further includes a transmission mode indication, and a transmission mode includes closed-loop spatial multiplexing CLSM, open-loop spatial multiplexing OLSM, or transmit diversity TXD.

With reference to the third aspect and the foregoing implementations of the third aspect, in a fifth implementation of the third aspect, precoding information in the downlink control parameter includes the transmission mode indication, and the transmission mode includes CLSM, OLSM, or TXD.

With reference to the third aspect and the foregoing implementations of the third aspect, in a sixth implementation of the third aspect, information included in the downlink control information is coded by using a joint coding mode.

According to a fourth aspect, an embodiment of the present invention provides a base station, including a sending unit, configured to send downlink control information to first user equipment, where the downlink control information includes at least one of a downlink control parameter of the first user equipment, pairing layer information of the first user equipment, modulation scheme information of second user equipment, power allocation information, an identifier of the first user equipment, or pairing information, where the pairing layer information of the first user equipment includes a pairing relationship between a spatial layer of the first user equipment and a spatial layer of the second user equipment, the first user equipment and the second user equipment are in an associated user equipment group, the identifier is used to represent that the first user equipment is cell-center user equipment, and the pairing information is used to indicate whether the first user equipment is paired user equipment, where the sending unit is further configured to send a data signal of the associated user equipment group to the first user equipment, where the data signal of the associated user equipment group includes a data signal of the first user equipment and a data signal of the second user equipment.

With reference to the fourth aspect, in a first implementation of the fourth aspect, the sending unit is further configured to send the data signal of the associated user equipment group to the second user equipment.

With reference to the fourth aspect and the foregoing implementation of the fourth aspect, in a second implementation of the fourth aspect, the downlink control information further includes a transmission mode indication, and the base station further includes a processing unit, where the processing unit is configured to determine the transmission mode indication of the first user equipment according to a transmission mode of the second user equipment, where the transmission mode includes closed-loop spatial multiplexing CLSM, open-loop spatial multiplexing OLSM, or transmit diversity TXD.

With reference to the fourth aspect and the foregoing implementations of the fourth aspect, in a third implementation of the fourth aspect, information included in the downlink control information is coded by using a joint coding mode.

Based on the foregoing technical solutions, in the embodiments of the present invention, the first user equipment can demodulate a signal of the first user equipment from a received superposed signal according to the downlink control information. Therefore, the embodiments of the present invention provide a solution of transmitting a downlink control parameter in an SOMA communication process.

BRIEF DESCRIPTION OF THE DRAWINGS

To describe the technical solutions of the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a diagram of an architecture of a communications system to which a semi-orthogonal transmission-based communication method is applied according to an embodiment of the present invention;

FIG. 2 is a schematic flowchart of a semi-orthogonal transmission-based communication method according to an embodiment of the present invention;

DETAILED DESCRIPTION OF ILLUSTRATIVE EMBODIMENTS

Figure 3:
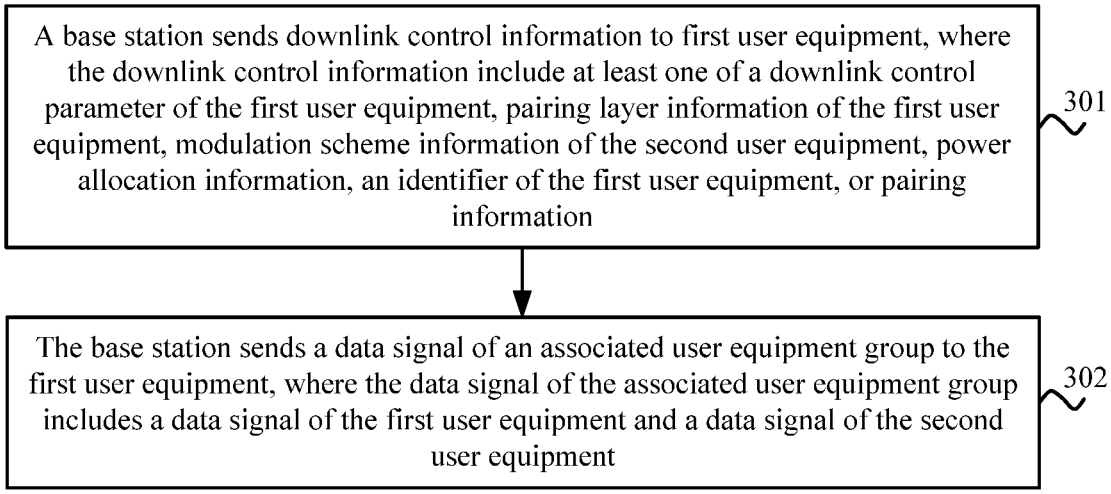
FIG. 3 is a schematic flowchart of a semi-orthogonal transmission-based communication method according to another embodiment of the present invention.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should also be understood that in the embodiments of the present invention, user equipment (UE) may be referred to as a terminal (Terminal), a mobile station (MS), a mobile terminal, or the like. The user equipment may communicate with one or more core networks through a radio access network (RAN). For example, the user equipment may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network. For ease of description, these devices are collectively referred to as user equipment or UE in this specification.

In the embodiments of the present invention, a base station (BS) may be a base transceiver station (BTS) in GSM or CDMA, may be a NodeB (NB) in WCDMA, or may be an evolved NodeB (eNB, or e-NodeB) in LTE, or a base station in another evolved network. This is not limited in the present invention. For ease of description, these base stations are collectively referred to as a base station or BS in this specification.

FIG. 1 is a diagram of an architecture of a communications system to which a semi-orthogonal transmission-based communication method is applied according to an embodiment of the present invention. As shown in FIG. 1, a base station 101 may communicate with user equipments (102a, 102b) based on an SOMA technology. The user equipment 102a is cell-center UE, and the user equipment 102b is cell-edge UE. Specifically, the base station may determine whether the user equipment is the cell-center UE or the cell-edge UE according to information such as a signal-to-noise ratio, a path loss, or a geographical location. This is not limited in this embodiment of the present invention. In addition, the cell-center UE and the cell-edge UE are relative concepts rather than absolute concepts geographically. To avoid ambiguity, the following uses first user equipment (namely, the cell-center UE) and second user equipment (namely, the cell-edge UE) as examples for description.

In a communication process, the base station 101 may pair the user equipment 102a with the user equipment 102b as a group, that is, an associated user equipment group. In this way, the base station 101 combines transmission signals of the user equipment 102a and the user equipment 102b into one signal and sends the signal. That is, a signal sent by the base station 101 includes a signal of the user equipment 102a and a signal of the user equipment 102b, and the signals of the user equipment 102a and the user equipment 102b have different power. It should be understood that multiple UEs may be grouped as an associated user equipment group. A quantity of user equipments in the associated user equipment group is not limited in this embodiment of the present invention. For ease of description, the following uses an example of pairing two user equipments for description.

After the user equipment 102b receives the signal sent by the base station 101, because power of the signal of the user equipment 102a is relatively low, the user equipment 102b can directly demodulate the signal of the user equipment 102b accurately according to a normal procedure. After receiving the signal sent by the base station 101, the user equipment 102a determines a finally used demodulation scheme with reference to modulation scheme information of second user equipment and modulation scheme information of the user equipment 102a, so as to demodulate a data signal of the user equipment 102a from a received data signal.

For example, it is assumed that, in the received data signal, the first two symbols are data of the first user equipment 102a, and the last two symbols are data of the second user equipment 102b. Both the second user equipment 102b and the first user equipment 102a use a QPSK modulation scheme. In this way, the first user equipment 102a may use a 16 QAM demodulation scheme to demodulate the first two symbols, to obtain the data signal of the first user equipment 102a.

According to the semi-orthogonal transmission-based communication method provided in this embodiment of the present invention, a parameter used in an SOMA communication process is transmitted by using downlink control information (DCI). The following describes the embodiments of the present invention in more detail by using specific examples.

FIG. 2 is a schematic flowchart of a semi-orthogonal transmission-based communication method according to an embodiment of the present invention. The method may be applied to a network scenario shown in FIG. 1.

201. First user equipment receives downlink control information sent by a base station. The downlink control information includes at least one of a downlink control parameter of the first user equipment, pairing layer information of the first user equipment, modulation scheme information of second user equipment, power allocation information, an identifier of the first user equipment, or pairing information. The pairing layer information of the first user equipment includes a pairing relationship between a spatial layer of the first user equipment and a spatial layer of the second user equipment. The first user equipment and the second user equipment are in an associated user equipment group. The identifier is used to represent that the first user equipment is cell-center user equipment. The pairing information is used to indicate whether the first user equipment is paired user equipment, that is, whether the first user equipment is currently paired.

For example, the first user equipment may detect in a blind detection manner and receive the downlink control information. The downlink control parameter may be a downlink control parameter included in a DCI1 format, a DCI2 format, or a DCI2A format. The pairing layer information is used to indicate which spatial layers of the first user equipment and the second user equipment are paired.

The DCI1 format includes a resource allocation type, resource block allocation, a modulation and coding scheme, a quantity of hybrid automatic repeat request (HARQ) processes, a new data indicator, a redundancy version, a physical uplink control channel (PUCCH) transmission power control command, and a constellation allocation index. The DCI2 format includes a resource allocation type, resource block allocation, a power control command used for a PUCCH, a downlink allocation index, a quantity of HARQ processes, a transport-block-to-code-block mapping flag bit, a modulation and coding scheme, a new data indicator, a redundancy version, and precoding information. The DCI2A format includes a resource allocation type, resource block allocation, a transmitter power control (TPC) command used for a PUCCH, a downlink allocation index, a quantity of HARQ processes, a transport-block-to-code-block mapping flag bit, a modulation and coding scheme, a new data indicator, a redundancy version, and precoding information.

It should be understood that user equipment may determine whether the user equipment is the first user equipment, the second user equipment, or unpaired user equipment according to a format of the received downlink control information, information included in the received downlink control information, or the like. For example, identifier information is added to the downlink control information to identify whether the user equipment is near-end UE, or when receiving the downlink control information in a format shown in this embodiment of the present invention, the user equipment determines that the user equipment is the first user equipment. Similarly, the user equipment may determine whether the user equipment is the second user equipment or the unpaired user equipment according to the foregoing method. To avoid repetition, details are not described herein again. It should be understood that the examples are merely intended to help a person skilled in the art better understand the embodiments of the present invention, but not to limit the scope of the embodiments of the present invention.

202. The first user equipment receives a data signal of an associated user equipment group that is sent by the base station. The data signal of the associated user equipment group includes a data signal of the first user equipment and a data signal of the second user equipment.

For example, the base station may combine the first user equipment and the second user equipment into one data signal in a preset manner. Specifically, the first two symbols of the data signal may be the data signal of the first user equipment, and the last two symbols of the data signal may be the data signal of the second user equipment.

203. The first user equipment determines a data signal of the first user equipment according to the downlink control information and the data signal of the associated user equipment group.

For example, the first user equipment determines, according to a modulation scheme of the first user equipment and a modulation scheme of the second user equipment that are in the downlink control information, a demodulation scheme to be used for demodulating data of the first user equipment. For example, when the first user equipment uses a QPSK modulation scheme, and the second user equipment uses the QPSK modulation scheme, a demodulation scheme corresponding to 16 QAM may be used to demodulate the data signal corresponding to the first user equipment.

Based on the foregoing technical solution, in this embodiment of the present invention, the first user equipment can demodulate the signal of the first user equipment from a received superposed signal according to the downlink control information. Therefore, this embodiment of the present invention provides a solution of transmitting a downlink control parameter in an SOMA communication process.

In addition, the pairing layer information is used to indicate a status of spatial layer pairing between the second user equipment and the first user equipment, so that pairing of different multiple input multiple output (MIMO) spatial layers between the second user equipment and the first user equipment can be controlled, to improve pairing flexibility.

Optionally, in an embodiment, when the data signal of the first user equipment is determined according to the downlink control information and the data signal of the associated user equipment group, the first user equipment may determine power allocation ratios of the first user equipment and the second user equipment according to the modulation scheme information of the second user equipment in the downlink control information and a preconfigured power allocation comparison table.

The preconfigured power allocation comparison table includes a correspondence between a power allocation ratio and a modulation scheme combination. The modulation scheme combination includes a combination relationship between a modulation scheme of the first user equipment and a modulation scheme of the second user equipment.

Optionally, each modulation scheme combination may be corresponding to one power allocation ratio, or may be corresponding to multiple power allocation ratios. When each modulation scheme combination is corresponding to one power allocation ratio, the first user equipment may directly determine the power allocation ratios of the first user equipment and the second user equipment according to the modulation scheme information of the second user equipment in the downlink control information and the preconfigured power allocation comparison table. When each modulation scheme combination is corresponding to multiple power allocation ratios, the downlink control information needs to include the power allocation information, the power allocation information is used to indicate a currently used power allocation ratio, and the first user equipment determines the power allocation ratios of the first user equipment and the second user equipment according to the modulation scheme information of the second user equipment in the downlink control information, the power allocation information in the downlink control information, and the preconfigured power allocation comparison table. Then, the first user equipment determines the data signal of the first user equipment according to the downlink control information, the power allocation ratios, and the data signal of the associated user equipment group.

Specifically, a power allocation comparison table may be notified to UE by using radio resource control (RRC) signaling or Media Access Control (MAC) signaling, or may be defined in a protocol. The power allocation comparison table may be alternatively in another form, for example, a multi-UE power ratio. This is not limited in this embodiment of the present invention.

In this way, using the power allocation comparison table to determine current power allocation ratios of the first user equipment and the second user equipment can shorten a length of the downlink control information, and further reduce signaling overheads.

Optionally, in an embodiment, the downlink control information further includes the power allocation ratios of the first user equipment and the second user equipment. In this case, the first user equipment may directly determine the data signal of the first user equipment according to the downlink control information and the data signal of the associated user equipment group, with no need to pre-store and look up the power allocation comparison table.

Optionally, in another embodiment, when the data signal of the first user equipment is determined according to the downlink control information, the power allocation ratios, and the data signal of the associated user equipment group, a data signal corresponding to the spatial layer of the first user equipment indicated by the pairing layer information may be determined according to the downlink control information, the power allocation ratios, and the data signal of the associated user equipment group.

Optionally, in another embodiment, the downlink control information further includes a transmission mode indication, and a transmission mode includes close loop spatial multiplexing (CLSM), open loop spatial multiplexing (OLSM), or transmit diversity (TXD).

For example, the base station may set a transmission mode of the first user equipment in real time according to a transmission mode of the second user equipment. Specifically, the transmission mode of the first user equipment may be indicated by using a method for adding a transmission mode indication bit to the downlink control information or by using the precoding information in the DCI2. In this way, the first user equipment may be allowed to use a different transmission mode to pair with the second user equipment, increasing a pairing success rate. Specifically, a precoding vector or matrix index may be used to represent a different transmission mode.

Optionally, in another embodiment, precoding information in the downlink control parameter includes a transmission mode indication, and a transmission mode includes CLSM, OLSM, or TXD.

For example, the second user equipment may use a MIMO transmission mode of CLSM, OLSM, or TXD. In this case, precoding PM information in a system may be used to indicate a MIMO transmission mode used by a current UE, so that a transmission mode of the user equipment may be converted between MIMO transmission modes of CLSM, OLSM, and TXD, to increase a pairing success rate. Specifically, a precoding vector or matrix index may be used to represent a different transmission mode.

Optionally, in another embodiment, the downlink control information may include the identifier of the first user equipment. The identifier is used to represent that the first user equipment is cell-center user equipment.

Optionally, in another embodiment, information included in the downlink control information is coded by using a joint coding mode. By using the joint coding mode, a length of the first downlink control information can be further shortened, and signaling overheads are further reduced.

Optionally, in another embodiment, information such as power allocation, layer pairing, and the modulation scheme of the second user equipment may use an existing bit in the downlink control information, to further reduce a quantity of bits in the downlink control information. For example, a new data indicator and a transport-block-to-code-block mapping flag bit that are in the downlink control parameter are still used.

FIG. 3 is a schematic flowchart of a semi-orthogonal transmission-based communication method according to another embodiment of the present invention. The method may be applied to a network scenario shown in FIG. 1.

301. A base station sends downlink control information to first user equipment. The downlink control information includes at least one of a downlink control parameter of the first user equipment, pairing layer information of the first user equipment, modulation scheme information of second user equipment, power allocation information, an identifier of the first user equipment, or pairing information. The pairing layer information of the first user equipment includes a pairing relationship between a spatial layer of the first user equipment and a spatial layer of the second user equipment. The first user equipment and the second user equipment are in an associated user equipment group. The identifier is used to represent that the first user equipment is cell-center user equipment. The pairing information is used to indicate whether the first user equipment is paired user equipment.

The downlink control parameter may be a downlink control parameter included in a DCI1 format, a DCI2 format, or a DCI2A format. The pairing layer information is used to indicate which spatial layers of the first user equipment and the second user equipment are paired.

The DCI1 format includes a resource allocation type, resource block allocation, a modulation and coding scheme, a quantity of HARQ processes, a new data indicator, a redundancy version, a PUCCH transmission power control command, and a constellation allocation index. The DCI2 format includes a resource allocation type, resource block allocation, a power control command used for a PUCCH, a downlink allocation index, a quantity of HARQ processes, a transport-block-to-code-block mapping flag bit, a modulation and coding scheme, a new data indicator, a redundancy version, and precoding information. The DCI2A format includes a resource allocation type, resource block allocation, a TPC command used for a PUCCH, a downlink allocation index, a quantity of HARQ processes, a transport-block-to-code-block mapping flag bit, a modulation and coding scheme, a new data indicator, a redundancy version, and precoding information.

302. The base station sends a data signal of an associated user equipment group to the first user equipment. The data signal of the associated user equipment group includes a data signal of the first user equipment and a data signal of the second user equipment.

For example, the base station may combine the first user equipment and the second user equipment into one data signal in a preset manner. For another example, the first two symbols of the data signal are the data signal of the first user equipment, and the last two symbols of the data signal are the data signal of the second user equipment.

Based on the foregoing technical solution, in this embodiment of the present invention, the first user equipment can demodulate the signal of the first user equipment from a received superposed signal according to the downlink control information. Therefore, this embodiment of the present invention provides a solution of transmitting a downlink control parameter in an SOMA communication process.

In addition, the pairing layer information is used to indicate a status of spatial layer pairing between the second user equipment and the first user equipment, so that pairing of different multiple input multiple output (MIMO) spatial layers between the second user equipment and the first user equipment can be controlled, to improve pairing flexibility.

Optionally, in an embodiment, the base station may further send the data signal of the associated user equipment group to the second user equipment. In this way, the second user equipment uses the data signal of the first user equipment as an interference signal, and directly demodulates the data signal of the second user equipment from the entire signal of the associated user equipment group.

Optionally, in an embodiment, the downlink control information further includes a transmission mode indication, and a transmission mode includes CLSM, OLSM, or TXD. In this case, before the downlink control information is sent, a transmission mode indication of the first user equipment may be determined according to a transmission mode of the second user equipment.

For example, the base station may set a transmission mode of the first user equipment in real time according to the transmission mode of the second user equipment. Specifically, the transmission mode of the first user equipment may be indicated by using a method for adding a transmission mode indication bit to the downlink control information or by using the precoding information in the DCI2.

In this way, the second user equipment may use a MIMO transmission mode of CLSM, OLSM, or TXD. In this case, precoding PM information in a system may be used to indicate a MIMO transmission mode used by a current UE, so that a transmission mode of the user equipment may be converted between MIMO transmission modes of CLSM, OLSM, and TXD, to increase a pairing success rate.

Optionally, in another embodiment, information included in the downlink control information is coded by using a joint coding mode. By using the joint coding mode, a length of the first downlink control information can be further shortened, and signaling overheads are further reduced.

The following describes the embodiment of the present invention in detail by using specific examples. It should be noted that the examples are merely intended to help a person skilled in the art better understand the embodiments of the present invention, but not to limit the scope of the embodiments of the present invention.

When multiple UE pairs perform semi-orthogonal technology-based communication, the first user equipment needs to explicitly or implicitly learn the following information: power allocation ratios of the second user equipment and the first user equipment, the modulation scheme information of the second user equipment, information about which layers of the first user equipment and the second user equipment are paired, and identifier information that identifies the first user equipment.

The identifier information that identifies the first user equipment may be set to implicit information. For example, a format of the downlink control information or information included in the downlink control information may be used to indicate an identifier of user equipment. Specifically, when the downlink control information includes the modulation scheme information of the second user equipment, the user equipment may determine that the user equipment is the first user equipment. When the downlink control information does not include the modulation scheme information of the second user equipment, the user equipment may determine that the user equipment is the second user equipment. Alternatively, indication information may be added to the downlink control information to identify the identifier of the first user equipment. This is not limited in this embodiment of the present invention.

In addition, the power allocation ratios of the second user equipment and the first user equipment, the modulation scheme information of the second user equipment, the information about which layers of the first user equipment and the second user equipment are paired may be transmitted in a form of downlink control information. Specifically, a format of the downlink control information may be shown in Table 1.

TABLE 1

| M bits | DCI2 (based on TM3 and TM4) |
| | DCI2 (based on TM4) |
| | DCI1 (based on TM2) |
| | DCI2A (based on TM3) |
| N bits | Power allocation ratios |
| | Modulation scheme information |
| | of the second user equipment |
| | Pairing layer information |

As listed in Table 1, the M bits are used to carry a downlink control parameter of the first user equipment. The downlink control parameter may be a downlink control parameter included in a DCI1 format, a DCI2 format, or a DCI2A format. The N bits are used to carry the power allocation ratios, the modulation scheme information of the second user equipment, and the pairing layer information. The power allocation ratios and the modulation scheme information of the second user equipment may be indicated by one piece of information. Alternatively, the power allocation ratios, a modulation scheme of the first user equipment, and layer pairing information are combined and associated, to reduce a quantity of bits in use.

For example, different modulation scheme combinations have different power allocation candidate values. As shown in Table 2, it is assumed that each modulation scheme combination may be corresponding to four power allocation candidate values. It should be understood that a combination manner shown in Table 2 is merely an example, and a type of a power allocation candidate value and a combination manner of power allocation candidate values are not limited in this embodiment of the present invention.

TABLE 2

| Power allocation | Modulation scheme of paired UE | Pairing layer | Near-end/far-end UE | Paired or not | Meaning | Quantity of combination statuses |
|---|---|---|---|---|---|---|
| | | | | 0 | Single UE | 1 |
| 1-4 | 1/0 | 1-3 | 1 | 1 | First user equipment, four power levels, two far-end UE modulation schemes, and three layer pairing relationships | 24 |
| 1-4 | 1/0 | 1-3 | 0 | 1 | Second user equipment, four power levels, and two layer pairing combinations | 8 |

As listed in Table 2, there are four power allocation ratios, and the paired second user equipment has two modulation schemes. There are three pairing manners for the second user equipment and the first user equipment: A first layer of the second user equipment is paired with a first layer of the first user equipment, a second layer of the second user equipment is paired with a second layer of the first user equipment, or two layers of the second user equipment are paired with two layers of the first user equipment. In addition, whether a current UE is the first user equipment or the second user equipment, whether the current UE is paired or not, and the like further need to be represented. In this way, there is a total of 33 statuses.

Further, if the power allocation ratios and the modulation scheme of the second user equipment are represented in a manner of a combination of power and a modulation scheme, a quantity of statuses can be further reduced, and a quantity of required bits is further reduced.

TABLE 3

| Index | Near-end UE + far-end UE | Composite constellation | P1/P, P2/P | P1/P, P2/P | P1/P, P2/P | P1/P, P2/P |
|---|---|---|---|---|---|---|
| 0 | QPSK + QPSK | 16QAM | P00 | P01 | P02 | P03 |
| 1 | 16QAM + QPSK | 64QAM | P10 | P11 | P12 | P13 |
| 2 | 64QAM + QPSK | 256QAM | P20 | P21 | P22 | P23 |
| 3 | 16QAM + 16QAM | 256QAM | P30 | P31 | P32 | P33 |

As listed in Table 3, each modulation scheme combination may have four power allocation ratios. In this way, only six bits are required to represent all combination statuses of a modulation scheme currently used by the second user equipment, the power allocation ratios, and the layer pairing relationship. P1 is signal power of the first user equipment, P2 is signal power of the second user equipment, and P is total signal power. P00, P01, . . . , and P33 respectively represent values of the power allocation ratios.

TABLE 4

| Index | Near-end UE + far-end UE | Composite constellation | P1/P | P2/P |
|---|---|---|---|---|
| 0 | QPSK + QPSK | 16QAM | 0.2 | 0.8 |
| 1 | 16QAM + QPSK | 64QAM | 0.2381 | 0.7619 |
| 2 | 64QAM + QPSK | 256QAM | 0.2471 | 0.7529 |
| 3 | 16QAM + 16QAM | 256QAM | 0.0588 | 0.9412 |

Alternatively, as listed in Table 4, default power allocation may be used, and each modulation scheme combination is corresponding to one power allocation ratio. In this case, only four bits are required to represent all combination statuses of modulation schemes currently used by the second user equipment and the first user equipment, the power allocation ratios, and the layer pairing.

It is assumed that the second user equipment is limited to Z modulation schemes, each modulation scheme combination has Y power allocation levels, and there are two layer pairing relationships (one layer of the near-end UE+one layer of the far-end UE, and two layers of the near-end UE+one layer of far-end UE 1+one layer of far-end UE 2). The far-end UE may use a 16 QAM modulation scheme. In this case, a total quantity V of required bits is:

$$V = \lceil \log_2(1 + \max(L_{far} \times Y_{16\ QAM,far}, 1) + Z \times L \times \max(Y_{Z,QPSK,far}, Y_{16\ QAM,far})) \rceil \quad (1)$$

where $Y_{Z,QPSK,far}$ is a quantity of power allocation levels used when the far-end UE use a $Z^{th}$ modulation scheme combination (the far-end UE uses a QPSK mode), $Y_{16\ QAM,far}$ is a quantity of power allocation levels used when the far-end UE uses a 16 QAM pairing combination (it is assumed that no power allocation value is required when the far-end UE uses the QPSK mode), and L is a quantity of layer configuration status combinations.

When the near-end and far-end UEs use different DCI formats, the near-end UE may be converted between a far-end UE status and a single UE status, and the far-end UE may be converted between a near-end UE status and the single UE status. In this case, quantities of bits required by the first user equipment and the second user equipment are $V_{near}$ and $V_{far}$, respectively:

$$V_{near} = \lceil \log_2(1 + Z \times L \times \max(Y_{Z,QPSK,far}, Y_{16\ QAM,far})) \rceil \quad (2)$$

$$V_{far} = \lceil \log_2(1 + \max(L_{far} \times Y_{16\ QAM,far}, 1)) \rceil \quad (3)$$

A total quantity of required bits is:

$$V = \left\lceil \log_2\left(1 + \sum_{n=0}^{N-1} Y_n\right) \right\rceil \quad (4)$$

Alternatively, when the near-end and far-end UEs use a same DCI format, quantities of bits required by the first user equipment and the second user equipment are $V_{near}$ and $V_{far}$, respectively:

$$V_{near} = \left\lceil \log_2\left(1 + \sum_{n=0}^{N_{near}-1} Y_{n,near}\right) \right\rceil \quad (5)$$

$$V_{far} = \left\lceil \log_2\left(1 + \sum_{n=0}^{N_{far}-1} Y_{n,far}\right) \right\rceil \quad (6)$$

Figure 4:
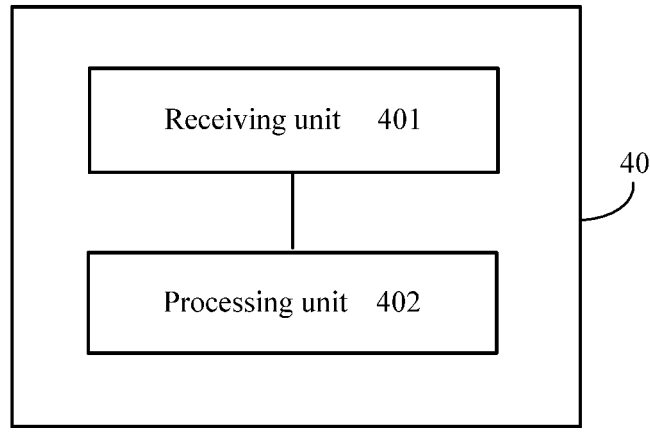
FIG. 4 is a schematic block diagram of user equipment according to an embodiment of the present invention.

FIG. 4 is a schematic block diagram of user equipment according to an embodiment of the present invention. As shown in FIG. 4, user equipment 40 includes a receiving unit 401 and a processing unit 402.

The receiving unit 401 is configured to receive downlink control information sent by a base station. The downlink control information includes at least one of a downlink control parameter of the user equipment, pairing layer information of the user equipment, modulation scheme information of second user equipment, power allocation information, an identifier of the user equipment, or pairing information. The pairing layer information of the user equipment includes a pairing relationship between a spatial layer of the user equipment and the second user equipment. The user equipment and the second user equipment are in an associated user equipment group. The identifier is used to represent that the user equipment is cell-center user equipment. The pairing information is used to indicate whether the user equipment is paired user equipment.

For example, the user equipment 40 may detect in a blind detection manner and receive the downlink control information. The downlink control parameter may be a downlink control parameter included in a DCI1 format, a DCI2 format, or a DCI2A format. The pairing layer information is used to indicate which spatial layers of the user equipment 40 and the second user equipment are paired.

The DCI1 format includes a resource allocation type, resource block allocation, a modulation and coding scheme, a quantity of hybrid automatic repeat request (HARQ) processes, a new data indicator, a redundancy version, a physical uplink control channel (PUCCH) transmission power control command, and a constellation allocation index. The DCI2 format includes a resource allocation type, resource block allocation, a power control command used for a PUCCH, a downlink allocation index, a quantity of HARQ processes, a transport-block-to-code-block mapping flag bit, a modulation and coding scheme, a new data indicator, a redundancy version, and precoding information. The DCI2A format includes a resource allocation type, resource block allocation, a transmitter power control (TPC) command used for a PUCCH, a downlink allocation index, a quantity of HARQ processes, a transport-block-to-code-block mapping flag bit, a modulation and coding scheme, a new data indicator, a redundancy version, and precoding information.

It should be understood that the user equipment may determine whether the user equipment is the user equipment 40, the second user equipment, or unpaired user equipment according to a format of the received downlink control information, information included in the received downlink control information, or the like. For example, identifier information is added to the downlink control information to identify whether the user equipment is near-end UE, or the user equipment determines that the user equipment is the user equipment 40 when receiving the downlink control information in a format shown in this embodiment of the present invention. Similarly, the user equipment may determine whether the user equipment is the second user equipment or the unpaired user equipment according to the foregoing method. To avoid repetition, details are not described herein again. It should be understood that the examples are merely intended to help a person skilled in the art better understand the embodiments of the present invention, but not to limit the scope of the embodiments of the present invention.

The receiving unit 401 is further configured to receive a data signal of an associated user equipment group that is sent by the base station. The data signal of the associated user equipment group includes a data signal of the user equipment and a data signal of the second user equipment.

For example, the base station may combine the first user equipment and the second user equipment into one data signal in a preset manner. Specifically, the first two symbols of the data signal may be the data signal of the first user equipment, and the last two symbols of the data signal may be the data signal of the second user equipment.

The processing unit 402 is configured to determine the data signal of the user equipment according to the downlink control information and the data signal of the associated user equipment group.

For example, the user equipment 40 determines, according to a modulation scheme of the user equipment 40 and a modulation scheme of the second user equipment that are in the downlink control information, a demodulation scheme to be used for demodulating data of the user equipment 40. For example, when the user equipment 40 uses a QPSK modulation scheme, and the second user equipment uses the QPSK modulation scheme, a demodulation scheme corresponding to 16 QAM may be used to demodulate the data signal corresponding to the user equipment 40.

Based on the foregoing technical solution, in this embodiment of the present invention, the user equipment can demodulate the signal of the user equipment from a received superposed signal according to the downlink control information. Therefore, this embodiment of the present invention provides a solution of transmitting a downlink control parameter in an SOMA communication process.

In addition, the pairing layer information is used to indicate a status of spatial layer pairing between the second user equipment and the first user equipment, so that pairing of different multiple input multiple output (MIMO) spatial layers between the second user equipment and the first user equipment can be controlled, to improve pairing flexibility.

Optionally, in an embodiment, the processing unit 402 is specifically configured to determine power allocation ratios of the user equipment and the second user equipment according to the modulation scheme information of the second user equipment in the downlink control information and a preconfigured power allocation comparison table.

The preconfigured power allocation comparison table includes a correspondence between a power allocation ratio and a modulation scheme combination. The modulation scheme combination includes a combination relationship between a modulation scheme of the user equipment and a modulation scheme of the second user equipment.

Optionally, each modulation scheme combination may be corresponding to one power allocation ratio, or may be corresponding to multiple power allocation ratios. When each modulation scheme combination is corresponding to one power allocation ratio, the processing unit 402 may directly determine the power allocation ratios of the first user equipment and the second user equipment according to the modulation scheme information of the second user equipment in the downlink control information and the preconfigured power allocation comparison table. When each modulation scheme combination is corresponding to multiple power allocation ratios, the downlink control information needs to include the power allocation information, the power allocation information is used to indicate a currently used power allocation ratio, and the processing unit 402 determines the power allocation ratios of the first user equipment and the second user equipment according to the modulation scheme information of the second user equipment in the downlink control information, the power allocation information in the downlink control information, and the preconfigured power allocation comparison table. Then, the processing unit 402 determines the data signal of the user equipment according to the downlink control information, the power allocation ratios, and the data signal of the associated user equipment group.

Specifically, a power allocation comparison table may be notified to UE by using radio resource control (RRC) signaling or Media Access Control (MAC) signaling, or may be defined in a protocol. The power allocation comparison table may be alternatively in another form, for example, a multi-UE power ratio. This is not limited in this embodiment of the present invention.

In this way, using the power allocation comparison table to determine current power allocation ratios of the first user equipment and the second user equipment can shorten a length of the downlink control information, and further reduce signaling overheads.

Optionally, in another embodiment, the downlink control information further includes the power allocation ratios of the user equipment and the second user equipment. In this case, the first user equipment may directly determine the data signal of the first user equipment according to the downlink control information and the data signal of the associated user equipment group, with no need to pre-store and look up the power allocation comparison table.

Optionally, in another embodiment, the processing unit 402 is specifically configured to determine, according to the downlink control information, the power allocation ratios, and the data signal of the associated user equipment group, a data signal corresponding to the spatial layer of the user equipment indicated by the pairing layer information.

Optionally, in another embodiment, the downlink control information further includes a transmission mode indication, and a transmission mode includes close loop spatial multiplexing CLSM, open loop spatial multiplexing OLSM, or transmit diversity TXD.

For example, the base station may set a transmission mode of the first user equipment in real time according to a transmission mode of the second user equipment. Specifically, the transmission mode of the first user equipment may be indicated by using a method for adding a transmission mode indication bit to the downlink control information or by using the precoding information in the DCI2. In this way, the first user equipment may be allowed to use a different transmission mode to pair with the second user equipment, increasing a pairing success rate. Specifically, a precoding vector or matrix index may be used to represent a different transmission mode.

Optionally, in another embodiment, precoding information in the downlink control parameter includes a transmission mode indication, and a transmission mode includes CLSM, OLSM, or TXD.

For example, the second user equipment may use a MIMO transmission mode of CLSM, OLSM, or TXD. In this case, precoding PM information in a system may be used to indicate a MIMO transmission mode used by a current UE, so that a transmission mode of the user equipment may be converted between MIMO transmission modes of CLSM, OLSM, and TXD, to increase a pairing success rate. Specifically, a precoding vector or matrix index may be used to represent a different transmission mode.

Optionally, in another embodiment, the downlink control information may include the identifier of the user equipment, and the identifier is used to represent that the user equipment is cell-center user equipment.

Optionally, in another embodiment, information included in the downlink control information is coded by using a joint coding mode. By using the joint coding mode, a length of the first downlink control information can be further shortened, and signaling overheads are further reduced.

Optionally, in another embodiment, information such as power allocation, layer pairing, and the modulation scheme of the second user equipment may use an existing bit in the downlink control information, to further reduce a quantity of bits in the downlink control information. For example, a new data indicator and a transport-block-to-code-block mapping flag bit that are in the downlink control parameter are still used.

Figure 5:
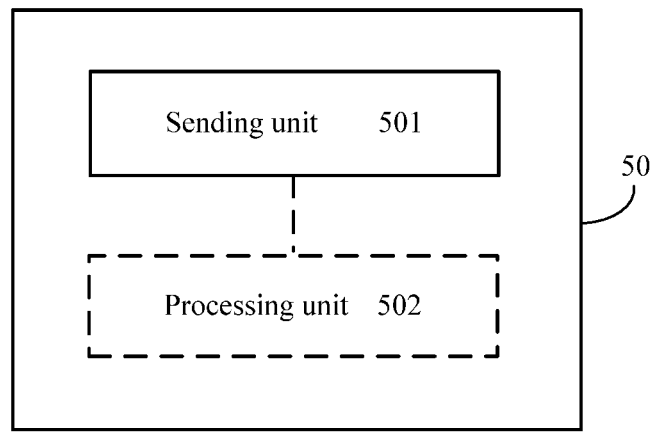
FIG. 5 is a schematic block diagram of a base station according to an embodiment of the present invention.

FIG. 5 is a schematic block diagram of a base station according to an embodiment of the present invention. As shown in FIG. 5, a base station 50 includes a sending unit 501 and a processing unit 502.

The sending unit 501 is configured to send downlink control information to first user equipment. The downlink control information includes at least one of a downlink control parameter of the first user equipment, pairing layer information of the first user equipment, modulation scheme information of second user equipment, power allocation information, an identifier of the first user equipment, or pairing information. The pairing layer information of the first user equipment includes a pairing relationship between a spatial layer of the first user equipment and a spatial layer of the second user equipment. The first user equipment and the second user equipment are in an associated user equipment group. The identifier is used to represent that the first user equipment is cell-center user equipment. The pairing information is used to indicate whether the first user equipment is paired user equipment.

The downlink control parameter may be a downlink control parameter included in a DCI1 format, a DCI2 format, or a DCI2A format. The pairing layer information is used to indicate which spatial layers of the first user equipment and the second user equipment are paired.

The DCI1 format includes a resource allocation type, resource block allocation, a modulation and coding scheme, a quantity of HARQ processes, a new data indicator, a redundancy version, a PUCCH transmission power control command, and a constellation allocation index. The DCI2 format includes a resource allocation type, resource block allocation, a power control command used for a PUCCH, a downlink allocation index, a quantity of HARQ processes, a transport-block-to-code-block mapping flag bit, a modulation and coding scheme, a new data indicator, a redundancy version, and precoding information. The DCI2A format includes a resource allocation type, resource block allocation, a TPC command used for a PUCCH, a downlink allocation index, a quantity of HARQ processes, a transport-block-to-code-block mapping flag bit, a modulation and coding scheme, a new data indicator, a redundancy version, and precoding information.

The sending unit 501 is further configured to send a data signal of the associated user equipment group to the first user equipment. The data signal of the associated user equipment group includes a data signal of the first user equipment and a data signal of the second user equipment.

For example, the base station may combine the first user equipment and the second user equipment into one data signal in a preset manner. For another example, the first two symbols of the data signal are the data signal of the first user equipment, and the last two symbols of the data signal are the data signal of the second user equipment.

Based on the foregoing technical solution, in this embodiment of the present invention, the first user equipment can demodulate the signal of the first user equipment from a received superposed signal according to the downlink control information. Therefore, this embodiment of the present invention provides a solution of transmitting a downlink control parameter in an SOMA communication process.

In addition, the pairing layer information is used to indicate a status of spatial layer pairing between the second user equipment and the first user equipment, so that pairing of different multiple input multiple output (MIMO) spatial layers between the second user equipment and the first user equipment can be controlled, to improve pairing flexibility.

Optionally, in an embodiment, the sending unit 501 is further configured to send the data signal of the associated user equipment group to the second user equipment. In this way, the second user equipment uses the data signal of the first user equipment as an interference signal, and directly demodulates the data signal of the second user equipment from the entire signal of the associated user equipment group.

Optionally, in another embodiment, the downlink control information further includes a transmission mode indication. The base station further includes the processing unit 502. The processing unit 502 is configured to determine a transmission mode indication of the first user equipment according to a transmission mode of the second user equipment. The transmission mode includes close loop spatial multiplexing CLSM, open loop spatial multiplexing OLSM, or transmit diversity TXD.

For example, the base station may set a transmission mode of the first user equipment in real time according to the transmission mode of the second user equipment. Specifically, the transmission mode of the first user equipment may be indicated by using a method for adding a transmission mode indication bit to the downlink control information or by using the precoding information in the DCI2.

In this way, the second user equipment may use a MIMO transmission mode of CLSM, OLSM, or TXD. In this case, precoding PM information in a system may be used to indicate a MIMO transmission mode used by a current UE, so that a transmission mode of the user equipment may be converted between MIMO transmission modes of CLSM, OLSM, and TXD, to increase a pairing success rate.

Optionally, in another embodiment, information included in the downlink control information is coded by using a joint coding mode. By using the joint coding mode, a length of the first downlink control information can be further shortened, and signaling overheads are further reduced.

Figure 6:
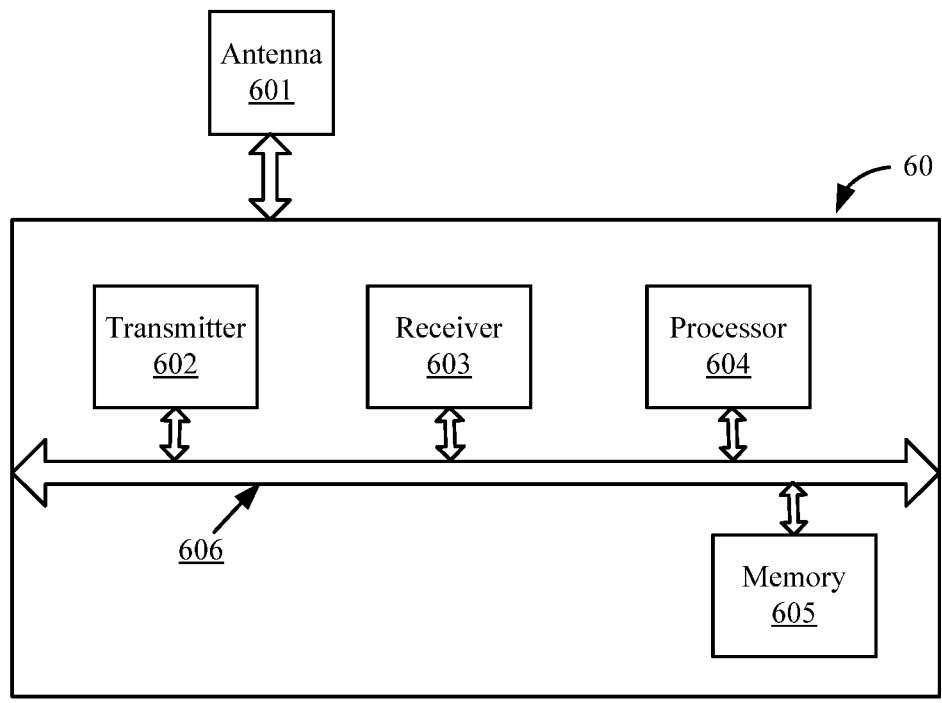
FIG. 6 is a schematic block diagram of a semi-orthogonal transmission-based device according to another embodiment of the present invention.

FIG. 6 is a schematic block diagram of a semi-orthogonal transmission-based device according to an embodiment of the present invention.

A device 60 in FIG. 6 may be used to implement steps and methods in the foregoing method embodiments. The device 60 in FIG. 6 includes an antenna 601, a transmitter 602, a receiver 603, a processor 604, and a memory 605. The processor 604 controls an operation of the device 60, and may be configured to process a signal. The memory 605 may include a read-only memory and a random access memory, and provides an instruction and data to the processor 604. The transmitter 602 and the receiver 603 may be coupled to the antenna 601. Components of the device 60 are coupled together by using a bus system 606. In addition to a data bus, the bus system 606 includes a power bus, a control bus, and a status signal bus. However, for clear description, various buses are denoted by the bus system 606 in the figure.

In an embodiment of the present invention, the device 60 may be user equipment, for example, may be the user equipment shown in FIG. 4. The memory 605 is configured to store a program, and the processor 604 executes the program to perform the following operations, including receiving downlink control information sent by a base station, where the downlink control information includes at least one of a downlink control parameter of the user equipment, pairing layer information of the user equipment, modulation scheme information of second user equipment, power allocation information, an identifier of the user equipment, or pairing information, where the pairing layer information of the user equipment includes a pairing relationship between a spatial layer of the user equipment and the second user equipment, the user equipment and the second user equipment are in an associated user equipment group, the identifier is used to represent that the user equipment is cell-center user equipment, and the pairing information is used to indicate whether the user equipment is paired user equipment, receiving a data signal of the associated user equipment group that is sent by the base station, where the data signal of the associated user equipment group includes a data signal of the user equipment and a data signal of the second user equipment, and determining the data signal of the user equipment according to the downlink control information and the data signal of the associated user equipment group.

Optionally, the downlink control parameter of the user equipment includes a modulation scheme of the user equipment, and the processor 604 is specifically configured to determine power allocation ratios of the user equipment and the second user equipment according to the modulation scheme information of the second user equipment in the downlink control information, and the power allocation information in the downlink control information, and a preconfigured power allocation comparison table, where the preconfigured power allocation comparison table includes a correspondence between a power allocation ratio and a modulation scheme combination, each modulation scheme combination is corresponding to multiple power allocation ratios, the power allocation information is used to indicate a currently used power allocation ratio, and the modulation scheme combination includes a combination relationship between a modulation scheme of the user equipment and a modulation scheme of the second user equipment, and determine the data signal of the user equipment according to the downlink control information, the power allocation ratios, and the data signal of the associated user equipment group.

Optionally, the downlink control parameter of the user equipment includes a modulation scheme of the user equipment, and the processor 604 is specifically configured to determine power allocation ratios of the user equipment and the second user equipment according to the modulation scheme information of the second user equipment in the downlink control information and a preconfigured power allocation comparison table, where the preconfigured power allocation comparison table includes a correspondence between a power allocation ratio and a modulation scheme combination, each modulation scheme combination is corresponding to one power allocation ratio, and the modulation scheme combination includes a combination relationship between a modulation scheme of the user equipment and a modulation scheme of the second user equipment, and determine the data signal of the user equipment according to the downlink control information, the power allocation ratios, and the data signal of the associated user equipment group.

Optionally, the processor 604 is specifically configured to determine, according to the downlink control information, the power allocation ratios, and the data signal of the associated user equipment group, a data signal corresponding to the spatial layer of the user equipment indicated by the pairing layer information.

Optionally, the downlink control information further includes a transmission mode indication, and a transmission mode includes close loop spatial multiplexing CLSM, open loop spatial multiplexing OLSM, or transmit diversity TXD.

Optionally, precoding information in the downlink control parameter includes a transmission mode indication, and a transmission mode includes CLSM, OLSM, or TXD.

Optionally, information included in the downlink control information is coded by using a joint coding mode.

In another embodiment of the present invention, the device 60 may be a base station, for example, may be the base station shown in FIG. 5. The memory 605 is configured to store a program, and the processor 604 executes the program to perform the following operations, including sending downlink control information to first user equipment, where the downlink control information includes at least one of a downlink control parameter of the first user equipment, pairing layer information of the first user equipment, modulation scheme information of second user equipment, power allocation information, an identifier of the first user equipment, or pairing information, where the pairing layer information of the first user equipment includes a pairing relationship between a spatial layer of the first user equipment and a spatial layer of the second user equipment, the first user equipment and the second user equipment are in an associated user equipment group, the identifier is used to represent that the first user equipment is cell-center user equipment, and the pairing information is used to indicate whether the first user equipment is paired user equipment, and sending a data signal of the associated user equipment group to the first user equipment, where the data signal of the associated user equipment group includes a data signal of the first user equipment and a data signal of the second user equipment.

Optionally, the processor 604 is further configured to send the data signal of the associated user equipment group to the second user equipment.

Optionally, the downlink control information further includes a transmission mode indication. The processor 604 is further configured to determine a transmission mode indication of the first user equipment according to a transmission mode of the second user equipment. The transmission mode includes close loop spatial multiplexing CLSM, open loop spatial multiplexing OLSM, or transmit diversity TXD.

Optionally, information included in the downlink control information is coded by using a joint coding mode.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A semi-orthogonal transmission-based communication method, comprising:
receiving, by a first user equipment, downlink control information sent by a base station, wherein the downlink control information comprises a downlink control parameter of the first user equipment and power allocation information, wherein the power allocation information indicates a currently used first signal power allocation of the first user equipment and further indicates a second signal power allocation of a second user equipment, wherein the downlink control parameter of the first user equipment comprises a modulation scheme of the first user equipment;
receiving, by the first user equipment, a data signal of an associated user equipment group that is sent by the base station, wherein the data signal of the associated user equipment group comprises a data signal of the first user equipment and a data signal of the second user equipment;
determining, by the first user equipment, the first signal power allocation and the second signal power allocation according to the power allocation information and a preconfigured power allocation comparison table, wherein the first signal power allocation is a signal power of the first user equipment divided by a total signal power, and wherein the second signal power allocation is a signal power of the second user equipment divided by the total signal power, wherein the preconfigured power allocation comparison table comprises a correspondence between the first signal power allocation, the second signal power allocation and a modulation scheme combination, and wherein the modulation scheme combination comprises a combination relationship between a modulation scheme of the first user equipment and a modulation scheme of the second user equipment; and
determining, by the first user equipment, the data signal of the first user equipment according to the downlink control information, the first signal power allocation and the second signal power allocation, and the data signal of the associated user equipment group.

2. The method of claim 1, wherein the downlink control information further comprises at least one of modulation scheme information of second user equipment, an identifier of the first user equipment, or pairing information, wherein the identifier indicates that the first user equipment is cell-center user equipment, and wherein the pairing information indicates whether the first user equipment is paired user equipment.

3. A semi-orthogonal transmission-based communication method, comprising:
sending, by a base station, downlink control information to first user equipment, wherein the downlink control information comprises a downlink control parameter of the first user equipment, and power allocation information, wherein the power allocation information indicates a currently used first signal power allocation of the first user equipment and further indicates a second signal power allocation of a second user equipment, wherein the first signal power allocation is a signal power of the first user equipment divided by a total signal power, and wherein the second signal power allocation is a signal power of the second user equipment divided by the total signal power, wherein the power allocation information is predefined in a preconfigured power allocation comparison table, wherein the preconfigured power allocation comparison table comprises a correspondence between a first signal power allocation and a second signal power allocation and a modulation scheme combination, and wherein the modulation scheme combination comprises a combination relationship between a modulation scheme of the first user equipment and a modulation scheme of the second user equipment; and
sending, by the base station, a data signal of an associated user equipment group to the first user equipment, wherein the data signal of the associated user equipment group comprises a data signal of the first user equipment and a data signal of the second user equipment.

4. The method according to claim 3, wherein the method further comprises:
sending, by the base station, the data signal of the associated user equipment group to the second user equipment.

5. The method according to claim 3, wherein information comprised in the downlink control information is coded by using a joint coding mode.

6. The method of claim 3, wherein the downlink control information further comprises at least one of modulation scheme information of second user equipment, an identifier of the first user equipment, or pairing information, wherein the identifier indicates that the first user equipment is cell-center user equipment, and wherein the pairing information indicates whether the first user equipment is paired user equipment.

7. User equipment, comprising:
a processor; and
a non-transitory computer-readable storage medium storing a program to be executed by the processor, the program including instructions to:
receive downlink control information sent by a base station, wherein the downlink control information comprises a downlink control parameter of the user equipment, and power allocation information, wherein the power allocation information indicates a currently used a first signal power allocation of the user equipment and further indicates a second signal power allocation of a second user equipment, wherein the downlink control parameter of the user equipment comprises a modulation scheme of the user equipment;
receive a data signal of an associated user equipment group that is sent by the base station, wherein the data signal of the associated user equipment group comprises a data signal of the user equipment and a data signal of the second user equipment;
determine the first signal power allocation and the second signal power allocation according to the power allocation information and a preconfigured power allocation comparison table, wherein the first signal power allocation is a signal power of the user equipment divided by a total signal power, and wherein the second signal power allocation is a signal power of the second user equipment divided by the total signal power, wherein the preconfigured power allocation comparison table comprises a correspondence between a first signal power allocation and a second signal power allocation and a modulation scheme combination, and wherein the modulation scheme combination comprises a combination relationship between a modulation scheme of the user equipment and a modulation scheme of the second user equipment; and
determine the data signal of the user equipment according to the downlink control information, the first signal power allocation and second signal power allocation, and the data signal of the associated user equipment group.

8. The user equipment of claim 7, wherein the downlink control information further comprises at least one of modulation scheme information of the second user equipment, an identifier of the user equipment, or pairing information, wherein the identifier indicates that the user equipment is cell-center user equipment, and wherein the pairing information indicates whether the user equipment is paired user equipment.

9. A base station, comprising:
a processor; and
a non-transitory computer-readable storage medium storing a program to be executed by the processor, the program including instructions to:
send downlink control information to first user equipment, wherein the downlink control information comprises a downlink control parameter of the first user equipment, and power allocation information, wherein the power allocation information indicates a currently used first signal power allocation of the first user equipment and further indicates a second signal power allocation of a second user equipment, wherein the first signal power allocation is a signal power of the first user equipment divided by a total signal power, and wherein the second signal power allocation is a signal power of the second user equipment divided by the total signal power, wherein the power allocation information is predefined in a preconfigured power allocation comparison table, wherein the preconfigured power allocation comparison table comprises a correspondence between a first signal power allocation and a second signal power allocation and a modulation scheme combination, and wherein the modulation scheme combination comprises a combination relationship between a modulation scheme of the first user equipment and a modulation scheme of the second user equipment; and send a data signal of an associated user equipment group to the first user equipment, wherein the data signal of the associated user equipment group comprises a data signal of the first user equipment and a data signal of the second user equipment.

10. The base station according to claim 9, wherein the instructions include instructions to send the data signal of the associated user equipment group to the second user equipment.

11. The base station of claim 9, wherein the downlink control information further comprises at least one of modulation scheme information of second user equipment, an identifier of the first user equipment, or pairing information, wherein the identifier indicates that the first user equipment is cell-center user equipment, and wherein the pairing information indicates whether the first user equipment is paired user equipment.

* * * * *